(12) United States Patent
Patel et al.

(10) Patent No.: US 6,175,433 B1
(45) Date of Patent: Jan. 16, 2001

(54) OPTICAL BIT RATE CONVERTER

(75) Inventors: Naimish S. Patel, Andover; Katherine L. Hall, Westford; John D. Moores, Concord; Kristin A. Rauschenbach, Lexington; Steven G. Finn, Framingham; Richard A. Barry, Brookline, all of MA (US)

(73) Assignee: Massachusetts Institute of Technology, Cambridge, MA (US)

( * ) Notice: Under 35 U.S.C. 154(b), the term of this patent shall be extended for 0 days.

(21) Appl. No.: 08/877,339

(22) Filed: Jun. 17, 1997

Related U.S. Application Data

(60) Provisional application No. 60/037,932, filed on Feb. 14, 1997.

(51) Int. Cl.[7] .............................. H04J 14/08; H04B 10/06

(52) U.S. Cl. ......................... 359/138; 359/158; 359/188; 359/195

(58) Field of Search .................................... 359/127, 138, 359/139, 188, 189, 193, 195, 158

(56) References Cited

U.S. PATENT DOCUMENTS

| | | | |
|---|---|---|---|
| 5,566,261 | 10/1996 | Hall et al. | 385/27 |
| 5,760,948 | * 6/1998 | Bigo | 359/326 |
| 5,900,956 | * 5/1999 | Cotter | 359/139 |
| 5,911,015 | * 6/1999 | Bigo | 385/1 |

OTHER PUBLICATIONS

Widdowson et al, "Soliton Shepherding; All Optical Active Soliton Control Over Global Distances", Electronic Letters, vol. 32, No. 9, pp828–830, Apr. 1996.*

Andrekson, P.A., Picosecond optical sampling using four-wave mixing in fibre, Electronics Letters, vol. 27, No. 16, pp. 1440–1441, Aug. 1991.

Barry et al., "All–optical network consortium–ultrafast TDM networks", IEEE Journal on Selected Areas in Communications, vol. 14, No. 5, pp. 999–1013, Jun. 1996.

Kanada et al., "Optical waveform measurement by optical sampling with a mode–locked laser diode", Optics Letters, vol. 11, No. 1, pp. 4–6, Jan. 1986.

Nelson et al., "Optical sampling oscilloscope using nonlinear fibre loop mirror", Electronics Letters, vol. 27, No. 3, pp. 204–205, Jan. 1991.

(List continued on next page.)

*Primary Examiner*—Leslie Pascal
(74) *Attorney, Agent, or Firm*—Fish & Richardson P.C.

(57) ABSTRACT

An optical bit rate for communication systems. The optical bit rate converter converts an ultra-high speed optical data stream to a lower rate optical data stream. In one embodiment, the optical bit rate converter converts the ultra-high speed optical data stream to a lower rate optical data stream that can be detected and processed electronically. The optical rate converter includes a buffer presenting a repeating optical data bit pattern, an optical sampler presenting an optical sampling bit stream, and an optical correlator. The optical correlator has a first input in communication with the output of the buffer and a second input in communication with the output of the optical sampler. The optical correlator produces a rate-converted optical data bit stream at its output in response to the repeating optical data bit pattern produced by the buffer and the optical sampling bit stream produced by the optical sampler. In one embodiment, the buffer has a data input and stores an optical data bit stream received from a high speed optical data source. In another embodiment, the optical bit rate converter time dilates the repeating optical data bit pattern received from the buffer. In yet another embodiment, the optical bit rate converter demultiplexes the repeating optical data bit pattern received from the buffer. The invention also relates to a method for rate-converting an ultra-high speed optical data stream to a lower rate optical data stream.

30 Claims, 10 Drawing Sheets

OTHER PUBLICATIONS

Patel et al., "All–optical rate conversion", OFC'97: Optical Fiber Communication Conference and Exhibit—Technical Digest, vol. 6, pp. 87–88, Feb. 16–21, 1997.

Patel et al., "40–Gb/s demultiplexing using an ultrafast nonlinear interferometer (UNI)", IEEE Photonics Technology Letters, vol. 8, No. 12, pp. 1695–1697, Dec. 1996.

Patel et al., "40–Gbit/s cascadable all–optical logic with an ultrafast nonlinear interferometer", Optics Letter, vol. 21, No. 18, pp. 1466–1468, Sep. 1996.

Takara et al., "Optical signal eye diagram measurement with subpicosecond resolution using optical sampling", Electronics Letter, vol. 32, No. 15, pp. 1399–1400, Jul. 1996.

Takara et al, "100 Gbit/s optical waveform measurement with 0.6ps resolution optical sampling using subpicosecond supercontinuum pulses", Electronic Letters vol. 30, No. 14, pp. 1152–1153, Jul. 1994.

* cited by examiner

OPTICAL BIT RATE CONVERTER

This patent application claims priority from U.S. Provisional Application No. 60/037,932, filed on Feb. 14, 1997, herein incorporated by reference.

STATEMENT REGARDING FEDERALLY SPONSORED RESEARCH

This invention was made with government support under ARPA Contract Number 673-668 and AF Contract Number F19628-95C-0002. The U.S. Government has certain rights in the invention.

FIELD OF THE INVENTION

The invention relates generally to a bit rate converter for communication systems and more specifically to an optical bit rate converter for high speed communication systems.

BACKGROUND OF THE INVENTION

An optical bit rate converter is an important component for communication and computing systems such as ultra-high speed, time division multiplexed (TDM) multi-access networks. In TDM multi-access networks, the network bus may operate at a rate of 100 Gb/s. However, the data processing may be performed electronically. The electronic device receiving the ultra-high speed (on the order of 100 Gb/s) optical data stream will require a receiver node to buffer the incoming ultra-high speed optical data stream, rate convert the optical data to electronic rates (approximately 100 MHz–10 GHz), and detect and process the data. Optical bit rate converters are useful for rate-converting ultra-high speed optical data streams to lower rate optical data streams that can be detected and processed electronically.

One method for performing rate conversion known to the prior art is to demultiplex every $K^{th}$ bit of an N bit long optical data packet, K and N being relatively prime. As used herein, a set of numbers is "relatively prime" when the greatest common divisor of all the numbers in the set is equal to one. Further, as used herein, the term data pattern means the series of bits being converted and includes but is not limited to blocks and packets of data. The time required to rate convert an entire pattern of optical data using this demultiplexing method is substantially $NKT_b$, where N is the length of the fundamental data pattern, K is an integer, and $T_b$ is the bit period (inverse of the bit rate) of the original optical data stream being rate-converted. This known demultiplexing method, with $K \neq (mN+1)$, where m is a whole number, however, scrambles the data bits of the original optical data pattern and requires further processing to reconstruct the original data pattern. In another known demultiplexing method, in addition to scrambling bits, only certain bits of data are selected from the original optical data stream and the rest of the bits are ignored. This demultiplexing method does not maintain all the bits of the original optical data stream in the rate-converted data stream.

In general, known bit rate converters utilize electronic or electro-optic devices, such as electronic memory. The bandwidth of these electrical devices limits the data rate of the optical data streams which can be rate-converted.

What is desired then is a rate converter which converts ultra-high speed optical data streams to lower rate optical data streams. The present invention permits such functionality.

SUMMARY OF THE INVENTION

The invention relates to an optical bit rate converter for high speed communication systems. The optical bit rate converter converts an ultra-high speed optical data stream to a lower rate optical data stream. In one embodiment, the optical bit rate converter converts the ultra-high speed optical data stream to a lower rate optical data stream that can be detected and processed electronically. The optical bit rate converter includes a buffer presenting a repeating optical data bit pattern, an optical sampler presenting an optical sampling bit stream, and an optical correlator. The optical correlator has a first input in communication with the output of the buffer and a second input in communication with the output of the optical sampler. The optical correlator produces a rate-converted optical data bit steam at its output in response to the repeating optical data bit pattern produced by the buffer and the optical sampling bit stream produced by the optical sampler. In one embodiment, the buffer generates the repeating optical data bit pattern. In another embodiment, the buffer has a data input and stores an optical data bit stream received from a high speed optical data source. In this embodiment, the buffer generates the repeating optical data bit pattern in response to the stored optical data bit stream. In yet another embodiment, the buffer is an optical memory. In another embodiment, the optical bit rate converter time dilates the repeating optical data bit pattern received from the buffer. In still another embodiment, the optical bit rate converter demultiplexes the repeating optical data bit pattern received from the buffer.

The invention also relates to a method for rate converting an ultra-high speed optical data stream to a lower rate optical data stream. The method includes the steps of providing a repeating optical data bit pattern, providing an optical sampling bit stream, correlating the repeating optical data bit pattern with the optical sampling bit stream, and producing a rate-converted optical data bit stream in response to the correlation. In one embodiment, the method rate converts an ultra-high speed optical data stream to a lower rate optical data stream that can be detected and processed electronically. In another embodiment, the method rate converts the repeating optical data bit pattern via demultiplexing. In yet another embodiment, the method rate converts the repeating optical data bit pattern via time dilation. In one embodiment, the method further includes the step of filtering the correlated repeating optical data bit pattern and optical sampling bit stream to remove the optical sampling bit stream.

The present invention has the technical advantage of accurately rate converting an ultra-high speed optical data bit stream to a lower rate optical data bit stream. In one embodiment, the present invention has yet the further advantage of maintaining the original sequence of the bits of the original ultra-high speed optical data stream in the rate-converted data stream without requiring further processing.

BRIEF DESCRIPTIONS OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
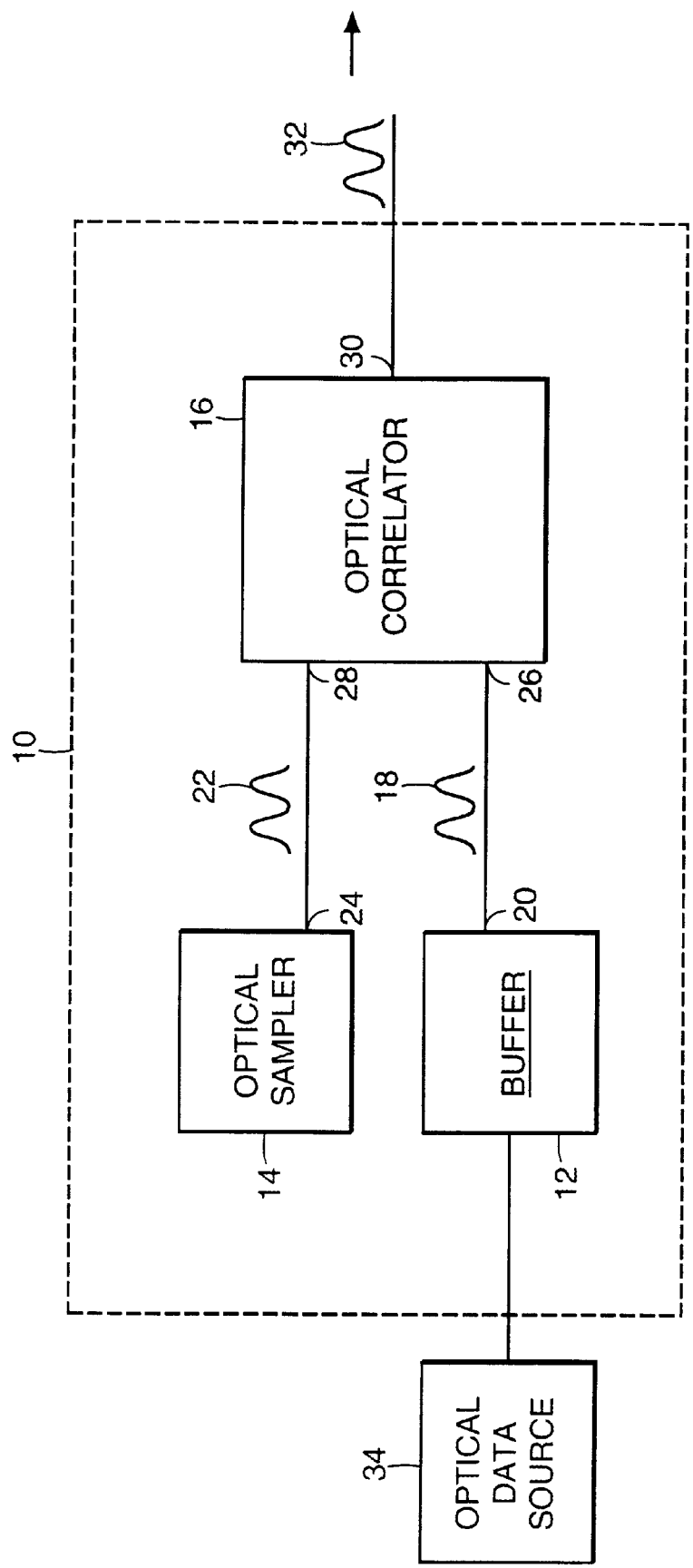
FIG. 1 is a block diagram of an embodiment of an optical bit rate converter according to the present invention.

Referring to FIG. 1 and in brief overview, an embodiment of an optical bit rate converter 10 constructed in accordance with the present invention includes a buffer 12, an optical sampler 14 and an optical correlator 16. For the purposes of this discussion the optical correlator is a non-linear optical element whose output signal is related to the multiplication of some function of its two input signals. The purpose of the buffer 12 is to function as a memory. The buffer 12 stores an optical data bit pattern 18 to be converted by the optical bit rate converter 10. The optical data bit pattern 18 is composed of a series of optical pulses. The optical data bit pattern 18 has a bit length N, a bit period $T_b$, and a bit rate $R_b=1/T_b$. The fundamental pattern length of the optical data bit pattern 18 is equal to $N/R_b$. The buffer 12 repeatedly presents the stored optical data bit pattern 18 at its output port 20.

The purpose of the optical sampler 14 is to generate an optical sampling bit stream 22 to sample the optical data bit pattern 18. The optical sampler 14 presents the optical sampling bit stream 22 at its output port 24. The optical sampling bit stream 22 is also composed of a series of optical pulses. The optical sampling bit stream 22 has a bit period $T_s$, substantially equal to $K \cdot T_b$, K being a positive real number; and a bit rate $R_s$ substantially equal to $R_b/K$. The bit rate $R_s$ of the optical sampling bit stream 22 is lower than the bit rate $R_b$ of the optical data bit pattern 18 in order to produce a rate-converted optical bit stream having a bit rate lower than the original optical data bit pattern 18.

The optical correlator 16 has a first input port 26 optically coupled to the output port 20 of the buffer 12, a second input port 28 optically coupled to the output port 24 of the optical sampler 14, and an output port 30. The purpose of the optical correlator 16 is to act as an optical switch, switching bits or portions of bits out of the repeating optical data bit pattern 18. In one embodiment, the optical correlator 16 may be any optical switch which functions as a logical AND gate. Examples of optical switches which may fiction as an AND gate include: a Non-linear Optical Loop Mirror (NOLM), a single-arm interferometer, and an optical amplifier. An embodiment of the optical correlator 16 according to the invention utilizing a NOLM will be described in more detail below in the discussion of FIG. 3.

The optical correlator 16 cross-correlates the optical sampling bit stream 22 received from the optical sampler 14 and the repeating optical data bit pattern 18 received from the buffer 12 to produce a rate-converted optical data bit stream 32 at the output port 30 of the optical correlator 16. The optical correlator 16 correlates the optical sampling bit stream 22 with the repeating optical data pattern 18 by ANDing the two signals 18, 22. The rate-converted optical data bit stream 32 contains the same pattern as the repeating optical data bit pattern 18, presented at a rate lower than the bit rate $R_b$ of the repeating optical data bit pattern 18. Because the optical correlator 16 switches individual bits or portions of bits out of the optical data bit pattern 18, the optical data bit pattern 18 must be presented to the optical correlator 16 many times to ensure that all of the bits of the optical data bit pattern 18 appear in the rate-converted optical data bit stream 32. The number of times the buffer 12 must present the optical data bit pattern 18 to the optical correlator 16 is substantially equal to the ratio of the bit rate $R_b$ of the optical data bit pattern 18 to the bit rate $R_c$ of the rate-converted optical data bit stream 32.

In one embodiment, the buffer 12 generates the optical data bit pattern 18 to be rate-converted. In another embodiment, the buffer 12 is a simple re-circulating optical loop which has a round-trip gain which is slightly less than one. In another embodiment, the buffer 12 is a regenerative memory in which the data bits are replaced on every circulation. In yet another embodiment, the buffer 12 is a circulating optical memory as described in U.S. Pat. No. 5,566,261, incorporated herein by reference. In another embodiment, the buffer 12 includes a coupling element for coupling optical signals into the buffer 12. The coupling element may be any coupler or a switch which couples the optical signals into the buffer 12. The coupling element may be an optical coupler or a 1×2 switch. In another embodiment, the coupling element may be a coupler or a switch which couples the optical signals into and out of the buffer 12. The coupling element may be an optical coupler or a 2×2 switch. In addition, the coupling element may input optical signals received from an optical data source 34 into the buffer 12. In a network embodiment, a number of buffers 12 would be used to rate-convert incoming optical data.

The optical sampler 14 may be an optical signal generator, an optical pulse source or an input data source. In one embodiment, the optical sampler 14 is a laser. Laser embodiments of the optical sampler 14 according to the invention will be discussed in more detail below in the description of FIGS. 5 and 8.

Methods used by the optical bit rate converter 10 to rate convert the repeating optical data bit pattern 18 include demultiplexing and time dilation. These two methods are discussed in detail below.

Demultiplexing

In one embodiment, the optical bit rate converter 10 rate converts the repeating optical data bit pattern 18 via demultiplexing. As explained above, the optical data bit pattern 18 has a bit length N, a bit period $T_b$, and a bit rate $R_b=1/T_b$. The optical sampling bit stream 22 has a bit period $T_s$ substantially equal to $K \cdot T_b$ and a bit rate $R_s=1/T_s$. In embodiments using demultiplexing, the ratio K of the bit period $T_s$ of the optical sampling bit stream 22 to the bit period $T_b$ of the optical data bit pattern 18 is an integer. Also, the bit rate $R_s$ of the optical sampling bit stream 22 is substantially, but not identically equal to $R_b/K$, $R_b$ being the bit rate of the optical data bit pattern 18. In another demultiplexing embodiment, the ratio K and the bit length N of the optical data bit pattern 18 are relatively prime. As used herein, a set of numbers is "relatively prime" when the greatest common divisor of all the numbers in the set is equal to one. K and N are relatively prime in order to ensure that every bit of the repeating optical data bit pattern 18 is maintained in the rate-converted optical data bit stream 32 and to ensure that no bits are repeated. In yet another embodiment, the ratio K is less than or equal to the bit length N. As the value of the ratio K increases, the rate conversion time increases.

In still another embodiment, K is substantially equal to mN+1. In this embodiment, the sequence of the bits in the repeating optical data bit pattern 18 is maintained in the rate-converted optical data bit stream 32 without further processing. In still yet another embodiment, K is not substantially equal to mN+1. In demultiplexing embodiments in which K is not substantially equal to mN+1, the rate-converted optical data bit stream 32 is a bit-scrambled version of the original repeating optical data bit pattern 18 and requires further processing to reconstruct the original sequence of bits of the original repeating optical data bit stream 18.

In one embodiment a transmitter places the bits from an incoming data stream providing data at a data rate of $R_b/l$, wherein $R_b$ is the bit rate and l is an integer >1, into a buffer capable of holding P bits at the data rate $R_b$. P and l are chosen such that P and l are relatively prime. In one embodiment the pulse width of the data pulses are such that intersymbol interference is avoided. The output of the buffer is in electrical communication with a high speed communication line. Under these conditions the buffer provides a reordered and rate converted datastream at its output port. Similarly, if the receiver is constructed with an input buffer capable of holding P bits at the data rate $R_b$ and if the correlator samples the buffer at the data rate, $R_b/l$, the initial data pattern to the transmitter will be reproduced.

In one embodiment of a demultiplexer, the output port of an input buffer holding the data pattern to be sampled is in communication with one input port of an optical correlator. Another input port of the optical correlator is in communication with an output port of an optical sampler. The output port of the optical correlator is either in direct communication with the network, or for high speed transmission is in communication with the input port of an output buffer. The output buffer holds the converted data pattern and then switches the data pattern onto the network which is in communication with its output port.

Embodiments of the optical bit rate converter 10 utilizing demultiplexing to rate convert the repeating optical data bit pattern 18 produce a rate-converted optical data bit stream 32 having a bit period $T_{rc}$ substantially equal to $K/R_b$, which is substantially equal to the bit period $T_s$ of the optical sampling bit stream 22. The rate-converted optical data bit stream 32 has a rate conversion time Tct substantially equal to $N \cdot K/R_b$.

Time Dilation

In another embodiment, the optical bit rate converter 10 rate converts the repeating optical data bit pattern 18 via time dilation. In embodiments using time dilation, the bit rate $R_s$ of the optical sampling bit stream 22 is substantially equal to $(R_b/mN) - \Delta f$, $\Delta f$ being an offset frequency, $R_b$ being the bit rate of the repeating optical data bit pattern 18, and N being the bit length of the repeating optical data bit pattern 18. m is selected as the largest positive integer for which $\Delta f = 0$. The offset frequency $\Delta f$ determines the rate at which the optical sampling bit stream 22 picks out portions of the repeating optical data pattern 18. The selection of the offset frequency $\Delta f$ changes the bit rate $R_{rc}$ of the rate-converted optical data bit stream 32. In one embodiment, the offset frequency $\Delta f$ is continuously tunable. In another time dilation embodiment, the ratio K of the bit period $T_s$ of the optical sampling bit stream 22 to the bit period $T_b$ of the optical data bit pattern 18 is a non-integer. In another time dilation embodiment, the ratio K is related to the fundamental pattern length N of the repeating optical data bit pattern 18 according to equation (1) below.

$$mN < K < mN+1 \qquad (1)$$

In this embodiment, the sequence of the bits in the repeating optical data bit pattern 18 is maintained in the rate-converted optical data bit stream 32 without further processing. Also, in this embodiment, when K is substantially, but not identically equal to mN, the offset frequency $\Delta f$ is substantially, but not identically equal to zero. Also, when K is substantially, but not identically equal to mN+1, $\Delta f$ is substantially, but not identically equal to $R_b/mN(mN+1)$. In this embodiment, the offset frequency $\Delta f$ is related to the bit rate $R_b$ and the fundamental pattern length N of the repeating optical data pattern 18 according to equation (2) below.

$$0 < \Delta f < \frac{R_b}{mN(mN+1)} \qquad (2)$$

In embodiments using time dilation, the achievable bit rates of the rate-converted optical data bit stream 32 have an upper bound approximately equal to $R_b/(mN+1)$, for m a natural number. Equation (2) demonstrates the range of permissible offset frequencies $\Delta f$ which may be used in this embodiment.

The upper bound of $\Delta f$ of $R_b/mN(mN+1)$ shown in equation (2) necessitates that for a given bit rate $R_b$ of a repeating optical data bit pattern 18, data patterns having longer fundamental pattern lengths N must be converted to lower rates than data patterns having shorter fundamental pattern lengths N. For example, an optical data pattern having a bit length N approximately equal to 1000 bits, and a bit rate $R_b$ approximately equal to 100 Gb/s can be rate-converted to a maximum rate of approximately 100 Mb/s.

In certain applications, such as a 100 Gb/s receiver node in a multi-access TDM network, it is desirable to minimize the amount of time required to rate convert a pattern of optical data. For example, in the case of a 100 Gb/s receiver node in a multi-access TDM network, the time to rate convert optical data packets must be minimized in order to minimize the probability of receive buffer overflow at the receiver node. A converted bit rate of approximately 100 Mb/s, corresponding to a packet read out time of approximately 10 $\mu$s, may not be sufficient to ensure the desired maximum packet overflow probability.

In one embodiment, to reduce the amount of time required to rate convert a data pattern of data, data patterns are converted using a parallel rate conversion scheme. In this embodiment, a plurality L of optical sampling bit streams are used to simultaneously rate convert L contiguous portions of a single data pattern. The plurality L of optical sampling bit streams may be differentiated by the wavelength of the pulses in the streams. The L rate-converted output blocks are then simultaneously detected and written into electronic memory.

In still another time dilation embodiment, the ratio K of the bit period $T_s$ of the optical sampling bit stream to the bit period $T_b$ of the optical data bit pattern 18 is substantially equal to mN+1. In these embodiments, the sequence of the bits in the repeating optical data bit pattern 18 is maintained in the rate-converted optical data bit stream 32 without further processing.

In embodiments in which K does not satisfy mN<K<mN+1 for any natural number m, the rate-converted optical data bit stream 32 is again a bit-scrambled version of the original repeating optical data bit pattern 18. Although the converted optical data bit stream is scrambled, the advantage of this general K approach is that it is much more flexible. It is no longer necessary to choose a sampling rate, $R_s$, that is very close to the pattern rate, $R_p$, or a subharmonic thereof, $R_b/mN$, as disctated by equation 2. The sampling rate may be chosen quite generally, but the number of samples per pattern p, satisfies the relationship $p/q=NT_b/T_s$, where $T_b$ is the data bit period, $T_s$ is the sample period, and q is the number of pattern lengths until the rate converted stream repeats. The fraction is reduced so that the numerator and denominator share no common integer factors greater than unity.

Typically p is selected to be at least the number of samples necessary to reconstruct the original data pattern to the desired degree of accuracy. If the ratio $NT_b/T_s$ is irrational, the number of samples, p, required to exactly reproduce the pattern is infinite. Infinite p may be acceptable, if a finite and sufficiently small number of successive samples will adequately reconstruct the pattern.

Embodiments of the optical bit rate converter 10 utilizing time dilation to rate convert the repeating optical data bit pattern 18 produce a rate-converted optical data bit stream 32 having a bit period $T_{rc}$ substantially equal to $1/(mN\Delta f)$ and a rate conversion time $T_{ct}$ substantially equal to $1/m\Delta f$.

For the sampling of long patterns, such as the multi-kb patterns stored in an optical buffer in a network, other time dilation approaches are available. For example, suppose it is desired to sample only an S bit block of the N bit pattern. The repetition frequency is modulated at frequency $R_b/N$ such that the sampling may take place only within the desired interval, of duration $(ST_b)$, within copies of the original data pattern. Because of the detuning by frequency $\Delta f$, the sampling pulses still scan through the data pattern. However, because of the modulation of the sampling pulses, only those sampling pulses which fall within the S bit subpattern produce data samples.

This technique provides automatic repetitive scanning of the desired subpattern without the need for a complicated modulation scheme for the sampling stream. The rise and fall times of the modulator will limit the resolution of the first and last bits of the subpattern, and therefore in one embodiment the sampling occurs in a temporal window of S bit periods plus twice the rise time of the modulator.

The detuning frequency $\Delta f$ is selected such that the subharmonic of the sampling rate that is closest to the data packet rate is defined by equation (3) below.

$$(S/N)(R_b+N\Delta f)/S=(R_b/N)+\Delta f \qquad (3)$$

The sampling stream rate of $(R_b/S)$ is an upper bound. Higher sampling stream rates would give more than one sampling pulse per S bit subpattern.

As an example of the simplest case, for 10 kb patterns (N=10,000) being transmitted at 100 Gb/s $(=R_b)$, the pattern modulation rate $R_b/N$ is 10 Mhz. If only a 20 bit subpattern is to be sampled (S=20) the fastest possible sampling rate for time dilation will be 5 GHz minus a small detuning frequency. The "modulator" would be periodically switched on for 200 ps and off for 99.98 ns. Because of the short transmission window, in one embodiment an optical switch is used to perform the modulation. In another example, the modulator is on for 200 ps and off for (100M+99.98)ns.

The above approach has the advantage that the modulation of the sampling stream is periodic. An alternative approach that works with slow modulation rise times but which requires a more complicated modulation scheme is to: use a basic period of modulation which is the inverse of the sampling stream rate such that N is evenly divisible by S; sample at a rate of $((S/N) R_b$—a detuning frequency); pass every (N/S)th sampling pulse until the sampling pulses have walked through the desired S-bit window; and then jump by one sampling stream period in order to reset the scanning process. Thus, the modulation is periodic at the packet rate minus a detuning frequency for as long as it takes to complete a scan. Then the period changes once by one inverse sampling stream rate and then the modulation is again periodic at the packet rate minus a detuning until the next scan is complete, and so on. With this approach, it is possible to use subharmonics of the above-mentioned sampling stream rate.

In one time dilation embodiment, the rate-converted optical data bit stream 32 produced at the output port 30 of the optical correlator 16 is filtered to obtain the envelope representing the rate-converted data bit stream. This embodiment is discussed in more detail below in the description of FIG. 2.

Figure 2:
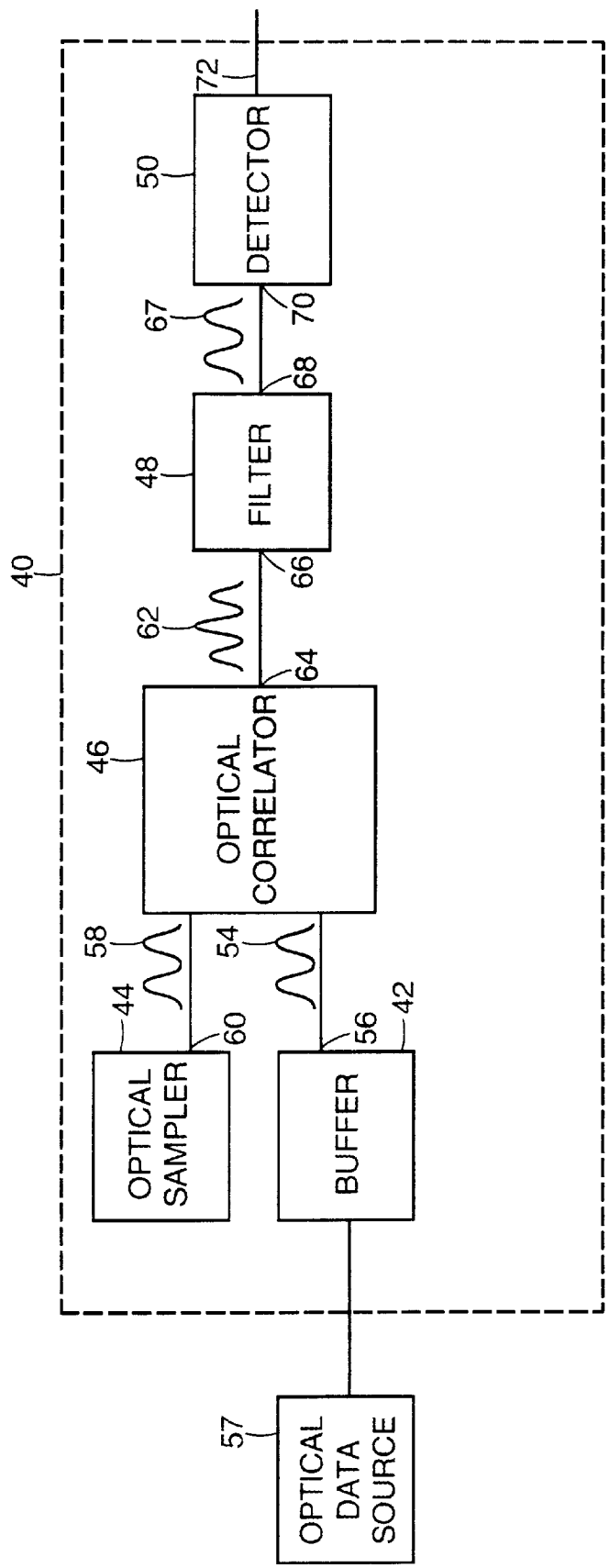
FIG. 2 is a block diagram of another embodiment of an optical bit rate converter according to the present invention.

Referring to FIG. 2, another embodiment of an optical bit rate converter 40 constructed in accordance with the present invention includes a buffer 42, an optical sampler 44, an optical correlator 46, a filter 48, and a detector 50. Similar to the optical bit rate converter 10 described above and shown in FIG. 1, the buffer 42 presents a repeating optical data bit pattern 54 at an output port 56. The repeating optical data bit pattern 54 may be generated by the buffer 42 or may be stored from an optical data source 57. The repeating optical data bit pattern 54 has a bit length N, a bit period $T_b$, and a bit rate $R_b=1/T_b$. The fundamental pattern length of the optical data bit pattern 54 is equal to $N/R_b$. The optical pulses forming the optical data bit pattern 54 have a wavelength $\lambda_2$. The optical sampler 44 presents an optical sampling bit stream 58 at an output port 60. The optical sampling bit stream 58 has a bit period $T_s$ substantially equal to $K \cdot T_b$, K being a positive real number; and a bit rate $R_s$ substantially equal to $R_b/K$. The optical pulses forming the optical sampling bit stream have a wavelength $\lambda_1$. In one embodiment, the wavelength $\lambda_1$ is not equal to the wavelength $\lambda_2$. The optical correlator 46 cross-correlates the optical sampling bit stream 58 received from the optical sampler 44 and the repeating optical data bit pattern 54 received from the buffer 42 to produce a rate-converted optical data bit stream 62 at the output port 64 of the optical correlator 46. Embodiments of the optical bit rate converter 40 utilize the demultiplexing and time dilation methods described above.

The output port 64 of the optical correlator 46 is optically coupled to the input port 66 of the filter 48. The purpose of the filter 48 is to remove the optical sampling bit stream 58 from the correlated signal 62, leaving only a rate-converted version 67 of the original optical data bit pattern 54. The filter 48 is not required if the optical sampling bit stream 58 is not present in the correlated signal 62 at the output port 64 of the optical correlator 46. In one embodiment, the filter 48 is an optical filter. In this embodiment, the filter 48 removes the optical sampling bit stream 58 from the correlated signal 62 by distinguishing the wavelength $\lambda_1$ of the optical pulses forming the optical sampling bit stream 58 from the wavelength $\lambda_2$ of the optical pulses forming the repeating optical data bit pattern 18. In this embodiment the wavelength $\lambda_1$ is not equal to the wavelength $\lambda_2$. The output port 68 of the filter 48 is in optical communication with the input 70 of the detector 50. The purpose of the detector 50 is to detect the rate-converted optical data bit pattern 67 and convert the optical signal 67 into an electrical signal at the output 72 of the detector 50. In one embodiment the detector is a photodiode. The bandwidth of the photodiode is typically faster than the bit rate $R_{rc}$ of the rate-converted optical data bit stream 67, but slower than the bit rate $R_s$ of the optical sampling bit stream 58. In one embodiment, the photodiode is a 750 MHz photodiode. The detector 50 can be any other device which converts photons to electrons and has a bandwidth faster than the bit rate $R_{rc}$ of the rate-converted optical data bit stream 67, but slower than the bit rate $R_s$ of the optical sampling bit stream 58. Examples of devices satisfying these requirements include phototransistors and avalanche photodiodes. In another embodiment, the optical correlator is configured to select from the sample stream rather than the data stream and places the sample stream at its output port. In yet another embodiment the output signal is further filtered by a narrow band optical filter (not shown). In such an embodiment the bandwidth of the filter is the bandwidth of the spectral content of the output pulses. In another embodiment this narrow band function is performed within filter 48.

In another embodiment, the optical bit rate converter 40 further comprises an electrical filter in electrical communication with the output 72 of the detector 50. This filter filters the rate-converted electrical output signal from the detector 50. In one embodiment, the electrical filter is a low-pass filter.

Figure 3:
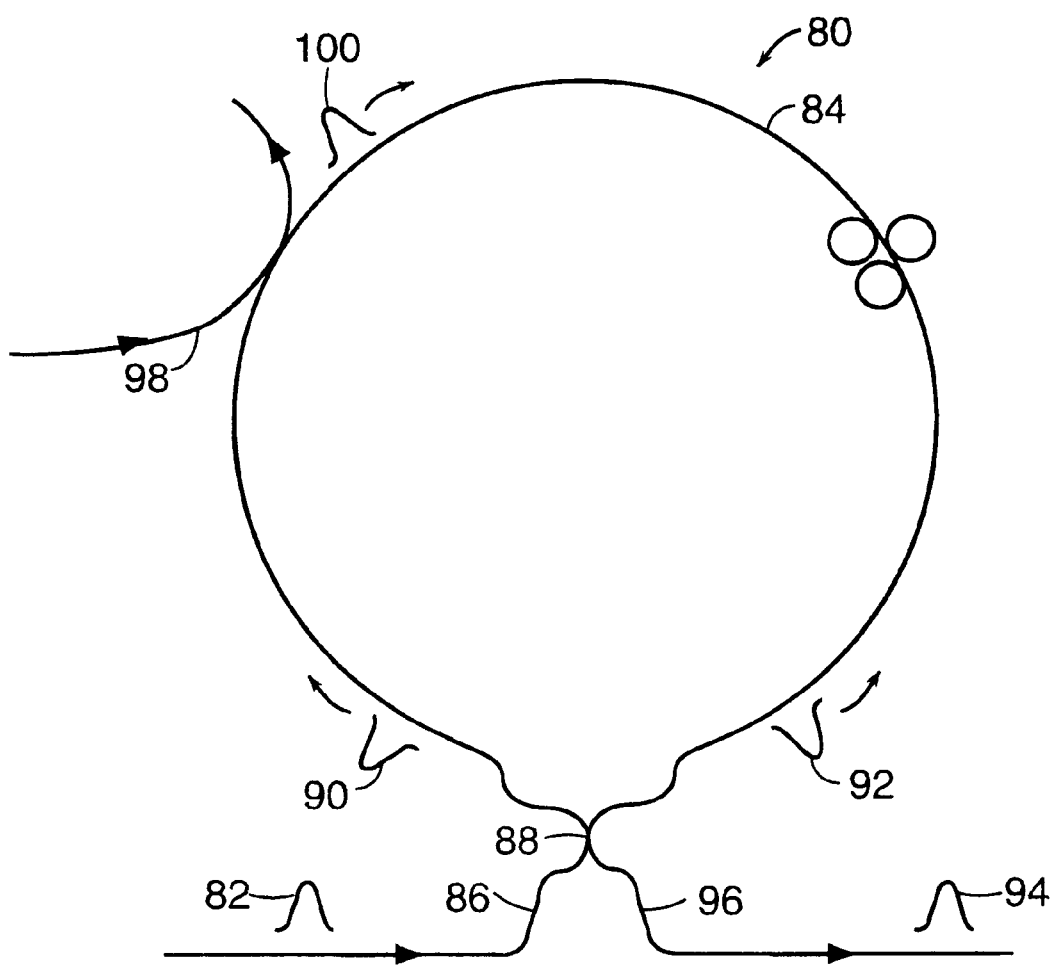
FIG. 3 is a schematic diagram of a Non-linear Optical Loop Mirror known to the prior art.

Referring to FIG. 3, in one embodiment, an optical correlator which may be used in an optical bit rate converter according to the invention is in the form of a Non-linear Optical Loop Mirror (NOLM) 80 which is configured as an optical AND gate. In this embodiment, an optical pulse 82 is introduced into an optical fiber loop 84 through an input port 86 by way of a beam splitter 88 or a 50:50 optical coupler. The optical fiber loop 84 may be a single mode fiber such as SMF-28 fiber. The optical fiber loop may also be dispersion shifted fiber (DSF). In one embodiment, the optical fiber loop is approximately 1 kilometer in length.

The input port 86 functions as one of the logical inputs to the optical AND gate. The beam splitter 88 splits the optical pulse 86 into two counter propagating optical pulses 90, 92 which travel around the loop 84. If both of the counter propagating optical pulses 90, 92 remain undisturbed during propagation, the optical pulses 90, 92 will recombine at the beam splitter 88 and form a single pulse which exits the optical fiber loop 84 by being reflected back out the input port 86. If either of the counter propagating optical pulses 90, 92 is modified relative to the other pulse 90, 92, an output pulse 94 leaves the optical fiber loop 84 through an output port 96. The output port 96 functions as the output of the optical AND gate. The counter propagating optical pulses 90, 92 may be modified by being phase shifted or delayed with respect to each other.

In this embodiment, the NOLM 80 is constructed to have an additional loop input port 98. The additional loop input port 98 functions as the second logical input to the optical AND gate. The additional input port 98 is constructed to inject an additional optical pulse 100 into the optical fiber loop 84. In one embodiment, the input port 98 is a 50:50 optical coupler. The interaction of the additional optical pulse 100 with one of the counter propagating optical pulses 90 will cause an output pulse 94 to leave the optical fiber loop 84 through the output port 96. The optical pulse 100 interacts with the counter propagating optical pulse 90 by phase shifting pulse 90. The NOLM 80 functions as an optical AND gate because an output pulse 94 is only generated when both an optical input pulse 82 and an input optical pulse 100 are concurrently circulating in the optical fiber loop 84.

Figure 4:
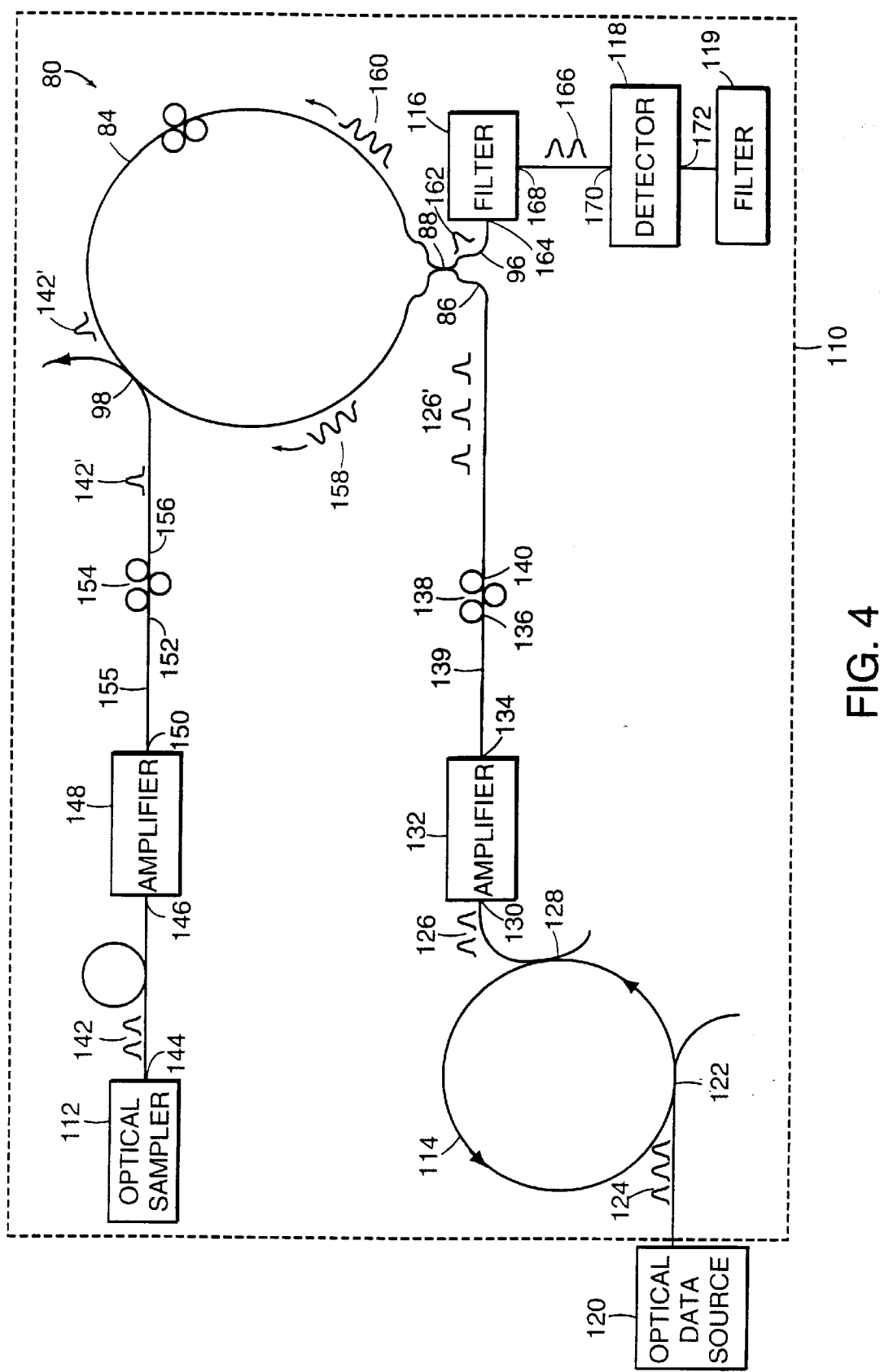
FIG. 4 is a detailed block diagram of another embodiment of an optical bit rate converter according to the present invention utilizing the Non-linear Optical Loop Mirror shown in FIG. 3 as a cross-correlator.

Referring now to FIG. 4, a block diagram shows an embodiment of an optical bit rate converter 110 according to the invention utilizing the NOLM 80 described above and shown in FIG. 3. The optical bit rate converter 110 includes an optical sampler 112, a buffer 114, a NOLM 80, a filter 116 and a detector 118. In the embodiment shown, an optical data source 120 is optically coupled to the buffer 114 through an optical coupler 122. The optical coupler 122 is utilized to couple a portion of the optical signal 124 from the optical data source 120 into the buffer 114. The buffer 114 stores the optical data bit pattern of the portion of the optical signal 124 received from the optical data source 120 and repeatedly presents the optical data bit pattern 126 at an output port 128 of the buffer 114. In one embodiment, the output port 128 of the buffer 114 is an optical coupler which couples optical signals out of the buffer 114. The output port 128 of the buffer 114 is coupled to the input port 130 of an amplifier 132. In another embodiment, the buffer 114 generates the optical data bit pattern 126 to be rate-converted.

The amplifier 132 receives and amplifies the optical data bit pattern 126. The amplifier 132 may be a fiber amplifier, semiconductor amplifier or any other optical amplifier. Any rare-earth doped fiber amplifier such as erbium, praseodymium, ytterbium-erbium or thulium doped fiber amplifier may be used. Other embodiments of the optical bit rate converter 110 may not include the amplifier 132. The amplifier 132 is used when the average power of the optical data bit pattern needs to be amplified. The output port 134 of the amplifier 132 is coupled to the input 136 of a polarization controller 138. The polarization controller 138 controls the polarization states of the optical signals in the fiber 139. Other embodiments of the optical bit rate converter 110 may not include the polarization controller 138. The output 140 of the polarization controller 138 is coupled to the input port 86 of the NOLM 80 which is configured as an all-optical AND gate. As explained above, the input port 86 functions as one logical input to an optical AND gate. The output 140 of the polarization controller 138 introduces the series of optical pulses 126' representing the optical data bit pattern 126 stored in the buffer 114 into the input port 86 of the NOLM 80.

The optical sampler 112 generates an optical sampling bit stream 142 and presents the optical sampling bit stream 142 at its output port 144. In one embodiment, the optical sampler 112 is a laser generating a series of optical pulses. The output port 144 of the optical sampler 112 is optically coupled to the input port 146 of a second amplifier 148. The amplifier 148 amplifies the optical sampling bit stream 142. The amplifier 148 may be a fiber amplifier or semiconductor amplifier. Any rare-earth doped fiber amplifier such as erbium, praseodymium, ytterbium-erbium or thulium doped fiber amplifier may be used. In another embodiment, the optical bit rate converter 110 does not include the amplifier 148. The amplifier 148 is used when the optical sampling bit stream 142 needs to be amplified. The output port 150 of the amplifier 148 is coupled to the input 152 of a polarization controller 154. The polarization controller 154 controls the polarization of the optical signals in the fiber 155. Other embodiments of the optical bit rate converter 110 may not include the polarization controller 138. The output 156 of the polarization controller 154 is coupled to a second input port 98 of the NOLM 80, which functions as the second logical input to the optical AND gate.

The amplified optical data bit pattern 126' from the buffer 114 enters the NOLM 80 by way of an optical coupler 88. The optical coupler 88 may be a 50:50 optical coupler or a beam splitter. The optical coupler 88 splits the series of optical pulses forming the optical data bit pattern 126' into two counter propagating series of optical pulses 158, 160 which travel around the optical loop 84.

If the optical sampler 112 does not inject an optical pulse 142' of the optical sampling bit stream 142 into the optical loop 84 through the second input port 98, the two counter-propagating series of optical pulses 158, 160 will remain unaffected, recombine, and be reflected back out the input port 86. If the optical sampler 112 injects an optical sampling pulse 142' into the optical loop 84, one of the counterpropagating series of optical pulses 158 will be affected and cause an optical output pulse 162 to exit the loop 84 through the output port 96 of the NOLM 80. The optical sampling pulse 142' interacts with one of the counter propagating series of optical pulses 158 by phase shifting the series of pulses 158. The generation of an output pulse 162 indicates the presence of both a pulse 126' from the optical data bit pattern 126 and an optical sampling pulse 142' from the optical sampling bit stream 142.

The output port 96 of the NOLM 80 is optically coupled to the input port 164 of the filter 116. The filter 116 may be any of the filters described above in the discussion of the filter 48 shown in FIG. 2. As explained above, the filter 116 separates the optical sampling pulses 142' from the correlated optical signal 162 and outputs a rate-converted optical data bit stream 166 at the output 168 of the filter 116. The output 168 of the filter 116 is in optical communication with the input 170 of the detector 118. The detector 118 may be any of the detectors described above in the discussion of the detector 50 shown in FIG. 2. The detector 118 detects the rate-converted optical data bit stream 166 and converts the optical signal 166 into an electrical signal at the output 172 of the detector 172.

In another embodiment, the optical bit rate converter 110 further comprises an electrical filter in electrical communication with the output 172 of the detector 118. This filter filters the rate-converted electrical output signal from the detector 118. In one embodiment, the electrical filter is a low-pass filter.

The buffer 114 repeatedly presents the optical data bit pattern 126 at its output port 128 until all of the bits forming the optical data bit pattern 126 have been processed through the NOLM 80.

Experimental Procedures

The optical bit rate converters 10, 40, and 110 described above and shown in FIGS. 1, 2 and 4 were designed during a research effort to develop a rate converter which can convert ultra-high speed optical data streams to lower rate optical data streams which can be detected and processed electronically. One goal of the research effort was to investigate the technical feasibility and utility of a method for rate conversion based on time dilation via optical sampling.

Figure 5:
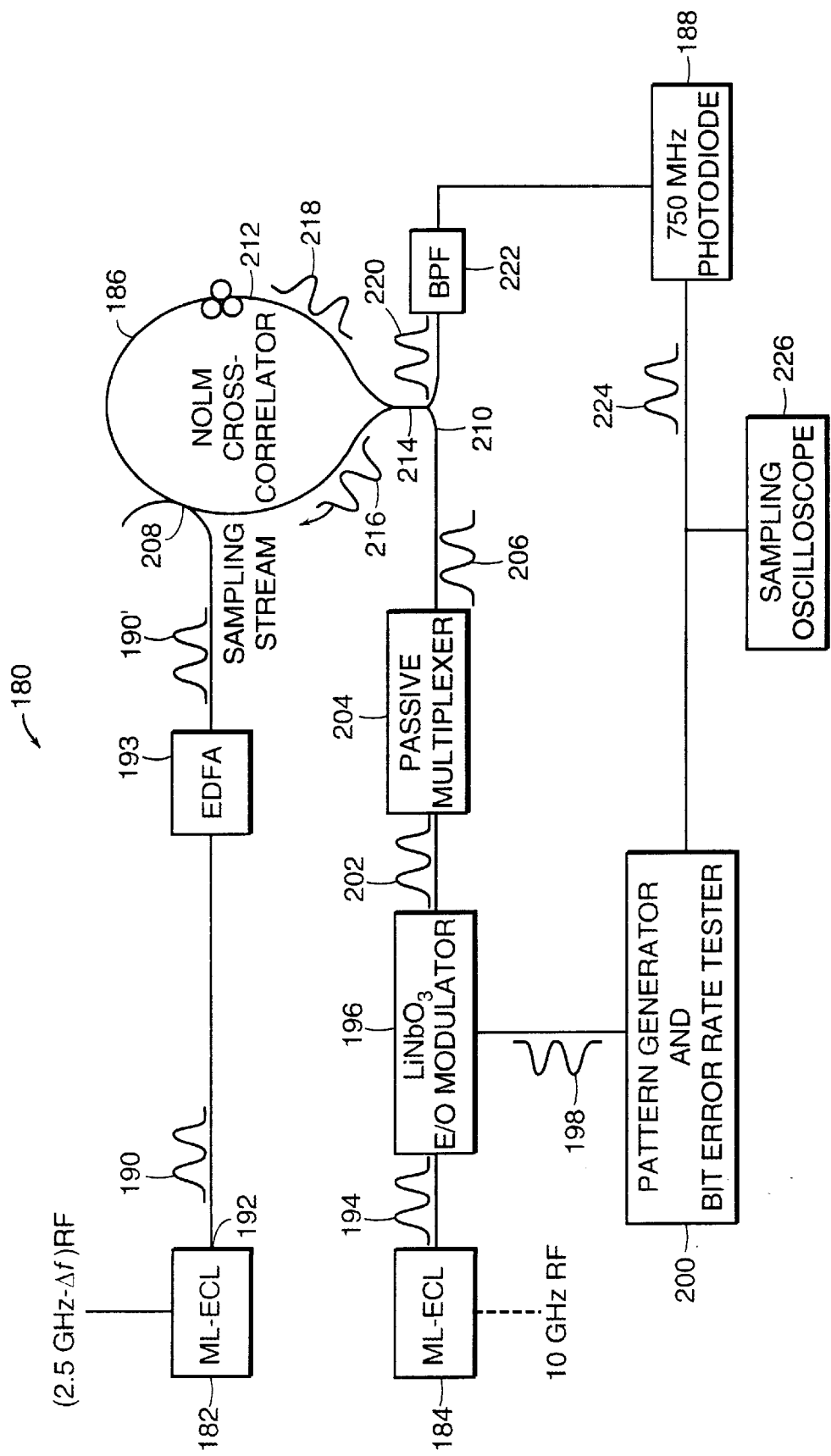
FIG. 5 is a block diagram of an embodiment of an optical bit rate converter according to the invention which was used in a series of experiments.

FIG. 5 shows an embodiment of an optical bit rate converter 180 evaluated during the research effort. The optical bit rate converter 180 can be used to convert ultra-high speed optical data packets to lower rate optical data packets which can be received and processed electronically. A feature of the rate conversion technique employed by the optical bit rate converter 180 is that under sampling brought about by sampling a high speed optical bit stream at a rate lower than the corresponding data bit rate of the optical bit stream gives rise to a time dilated version of the optical bit stream. The four key components of the optical bit rate converter 180 are the sampling laser 182, the data pattern generating laser 184, the NOLM cross-correlator 186 which is configured as an AND gate, and the detector 188. The optical bit rate converter 180 utilized the time dilation rate conversion method described above.

The sampling laser 182 generated an optical sampling bit stream 190 at its output 192. The sampling laser 182 used was a tunable mode-locked external cavity laser (ML-ECL). The optical output 190 of the sampling laser 182 was short optical pulses of 10 picoseconds duration at a repetition rate of 2.5 GHz minus $\Delta f$, where $\Delta f$ is an offset frequency. The offset frequency $\Delta f$ determined the length of time required to sample the entire optical data packet to be rate-converted. The optical sampling bit stream 190 was amplified by an amplifier 193 to produce an amplified optical sampling bit stream 190'. The amplifier 193 used was an Erbium Doped fiber amplifier.

The data pattern generating laser 184 generated the optical data bit stream 194 to be rate-converted. The laser 184 used was a ML-ECL which generated short optical pulses of 8 picosecond duration at a repetition rate of 10 GHz. The optical pulses 194 were electro-optically modulated by a modulator 196 using a 10 Gb/s 4 bit word pattern 198 produced by a pattern generator and bit-error rate tester 200. The modulated pulses 202 were then passively multiplexed by a multiplexer 204 to a bit rate $R_b$ of 80 Gb/s, thereby yielding an optical data packet 206 having a bit length N equal to 32 bits. The fundamental pattern repetition rate of the optical data packet 206 was approximately equal to $R_b/N$, which equaled 2.5 GHz. The laser 184 may be substituted by the buffers 12, 42 and 114 described above and shown in FIGS. 1, 2 and 4, respectively.

The amplified optical sampling bit stream 190' was introduced at an input port 208 as one logical input to the NOLM 186 which was configured as an optical AND gate or cross-correlator. The pulses of the optical data packet 206 were introduced as a second logical input to the NOLM 186 AND gate at an input port 210. The wavelengths $\lambda_1$ and $\lambda_2$ of the optical sampling bit stream 190 and optical data bit pattern 194, respectively, were chosen symmetrically around the dispersion zero of the optical fiber 212 forming the NOLM 186 to prevent pulse walk-off from leading to a reduction in sampling resolution. The dispersion zero of an optical fiber is where the second order dispersion is equal to zero. Typically optical pulses at different wavelengths have different velocities. By choosing the wavelength $\lambda_1$ and $\lambda_2$ of the optical sampling bit stream 190 and the optical data bit pattern 194, respectively, symmetrically around the dispersion zero of the optical fiber 212, the optical pulses 208, 216 and 218 traveling in the NOLM 186 had approximately the same velocity. The wavelengths $\lambda_1$ and $\lambda_2$ were also chosen to have different values so that a filter 222 could distinguish between the optical sampling bit stream 190 and the optical data bit pattern 194 after the signals were cross-correlated.

The NOLM cross-correlator 186 fuictioned similarly to the optical correlators 16, 46 described above and shown in FIGS. 1 and 2 respectively, and the NOLM 80 described above and shown in FIG. 4. As explained above, an optical coupler or beam splitter 214 split the series of pulses forming the optical data packet 206 into two counter propagating series of optical pulses 216, 218. When pulses from the optical bit stream 190' affected one or both of the counter propagating series of optical pulses 216, 218, an optical output pulse 220 exited the NOLM 186 and was detected by the detector 188 after being filtered by a filter 222. In the series of experiments, a 3 nanometer optical bandpass filter was used. The detector 188 converted the optical output pulses 220 into an electrical signal 224. The detector 188 used in the series of experiments was a 750 MHz 3 dB photodiode. The detector 188 was chosen to ensure that the envelope of the cross-correlated signal 220, and not individual sampling events were measured. The electrical signal 224 was displayed on a digital sampling oscilloscope 226 and checked by the pattern generator and bit error rate tester 200.

During the series of experiments, the offset frequency $\Delta f$ of the optical sampling bit stream 190 was varied to achieve a variety of output rates of the cross-correlated signal 220. Specifically, offset frequencies $\Delta f$ of 12.5 MHz, 6.25 MHz and 3.125 MHz were tested. These offset frequencies yielded rate-converted optical data bit streams at 400 Mb/s, 200 Mb/s and 100 Mb/s, respectively.

Figure 6:
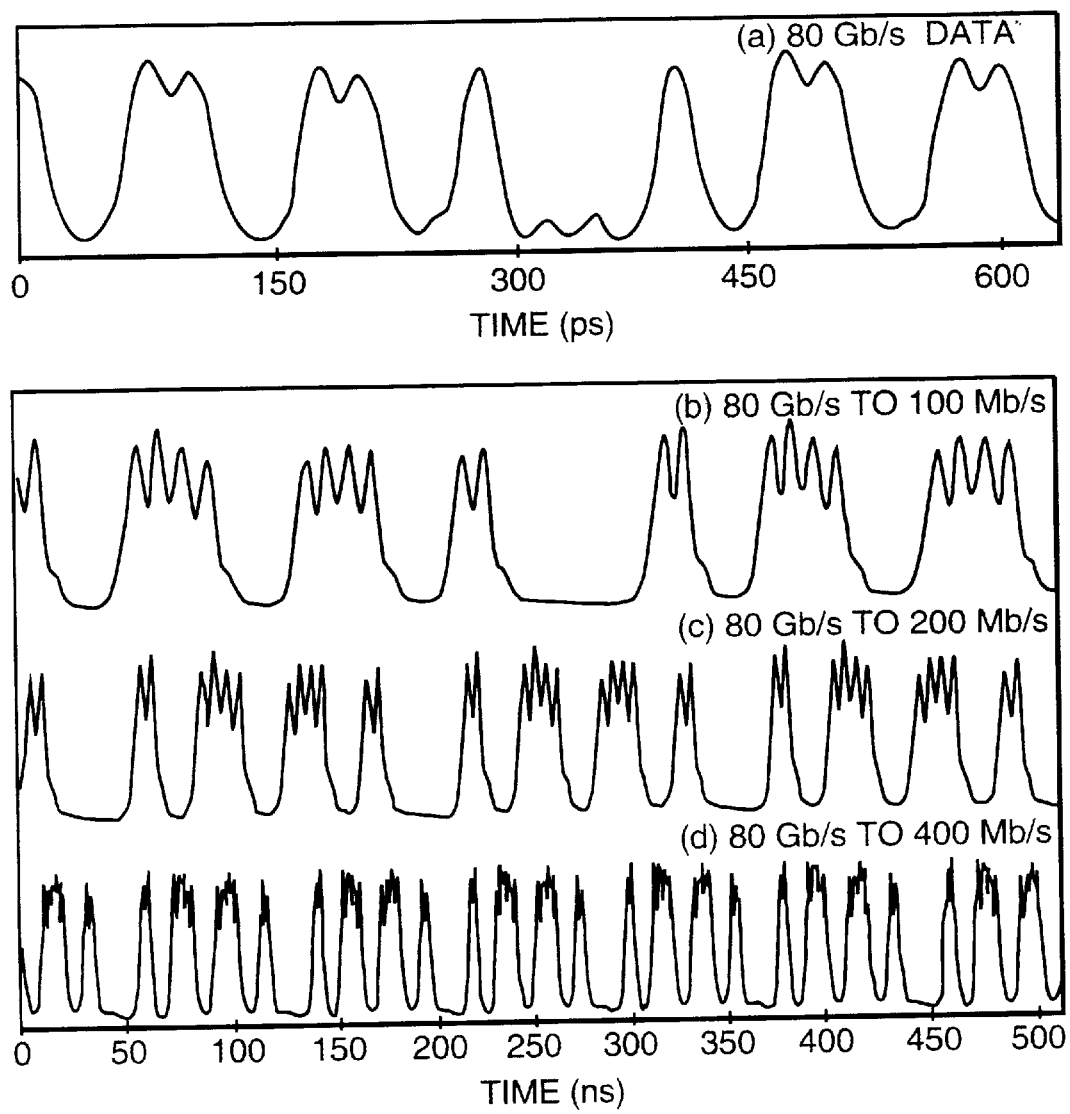
FIG. 6 is a chart illustrating three rate-converted data streams generated by the embodiment of the optical rate converter shown in FIG. 5.

FIG. 6 shows oscilloscope traces generated by the optical bit rate converter 180 described above and shown in FIG. 5 for a variety of outputs. The traces were displayed on the sampling oscilloscope 226 shown in FIG. 5. Waveform (a) depicts the original 80 Gb/s optical data bit stream 206 which was rate-converted. Waveform (b) depicts the original optical data bit stream 206 rate-converted to 100 Mb/s. Waveform (c) depicts the original optical data bit stream 206 rate-converted to 200 Mb/s. Finally, waveform (d) depicts the original optical data bit stream 206 rate-converted to 400 Mb/s. The original 80 Gb/s optical data bit stream 206 was detected with a 45 GHz 3 dB bandwidth photodiode and displayed on a 50 GHz bandwidth digital sampling oscilloscope. Because of limitations of the oscilloscope, the 12.5 picosecond period could not be fully resolved. The rate-converted data streams shown in waveforms (b), (c) and (d) were detected by a 750 MHz 3 dB bandwidth photodiode 188 and displayed on a digital sampling oscilloscope 226. The non-optimal resolution of waveforms (b), (c) and (d) was due to the pulse widths of the optical sampling bit stream 190 and optical data bit pattern 206, which were approximately 10 picoseconds (FWHM).

The repeating 32-bit rate-converted patterns shown in waveforms (b), (c) and (d) are the same as the 80 Gb/s data pattern which was input to the rate converter 180, only at different bit rates. The rate conversion method employed by the rate converter 180 has the advantage that the rate-converted patterns require no reordering of bits.

Figure 7:
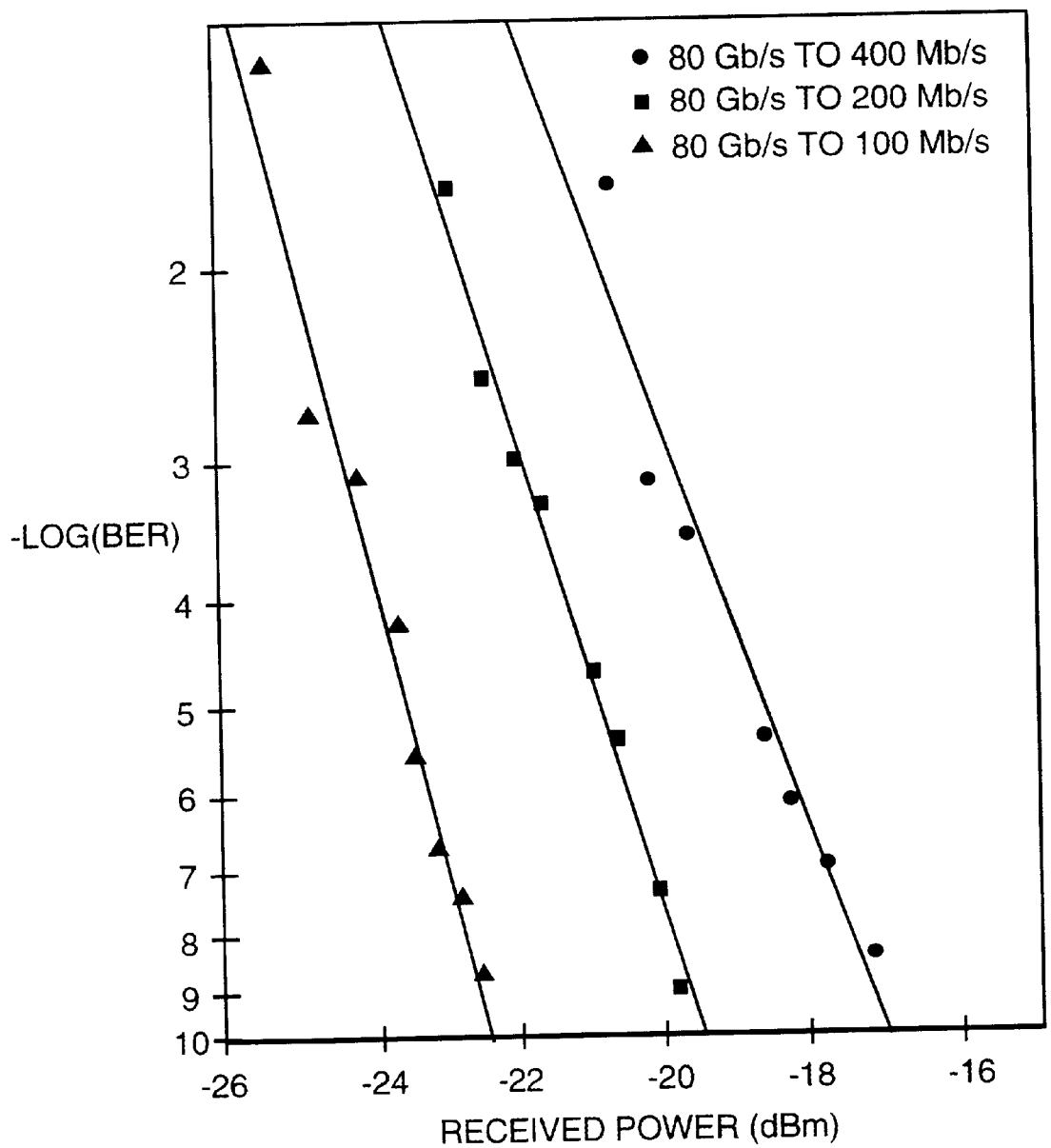
FIG. 7 is a chart illustrating bit-error rate measurements for the three rate-converted data streams shown in FIG. 6.

FIG. 7 is a graph illustrating bit-error rate measurements for the three rate-converted data bit streams of waveforms (b), (c) and (d) shown in FIG. 6. The graph shows approximately a 3 dBm increase in received power for each doubling of the bit rate of the rate-converted optical data bit stream output by the optical bit rate converter 180. This data is consistent with theory because a rate-converted optical data bit stream having a bit rate equal to 2R, has an energy per bit approximately equal to half the energy per bit of a rate-converted optical data bit stream having a bit rate equal to R.

Figure 8:
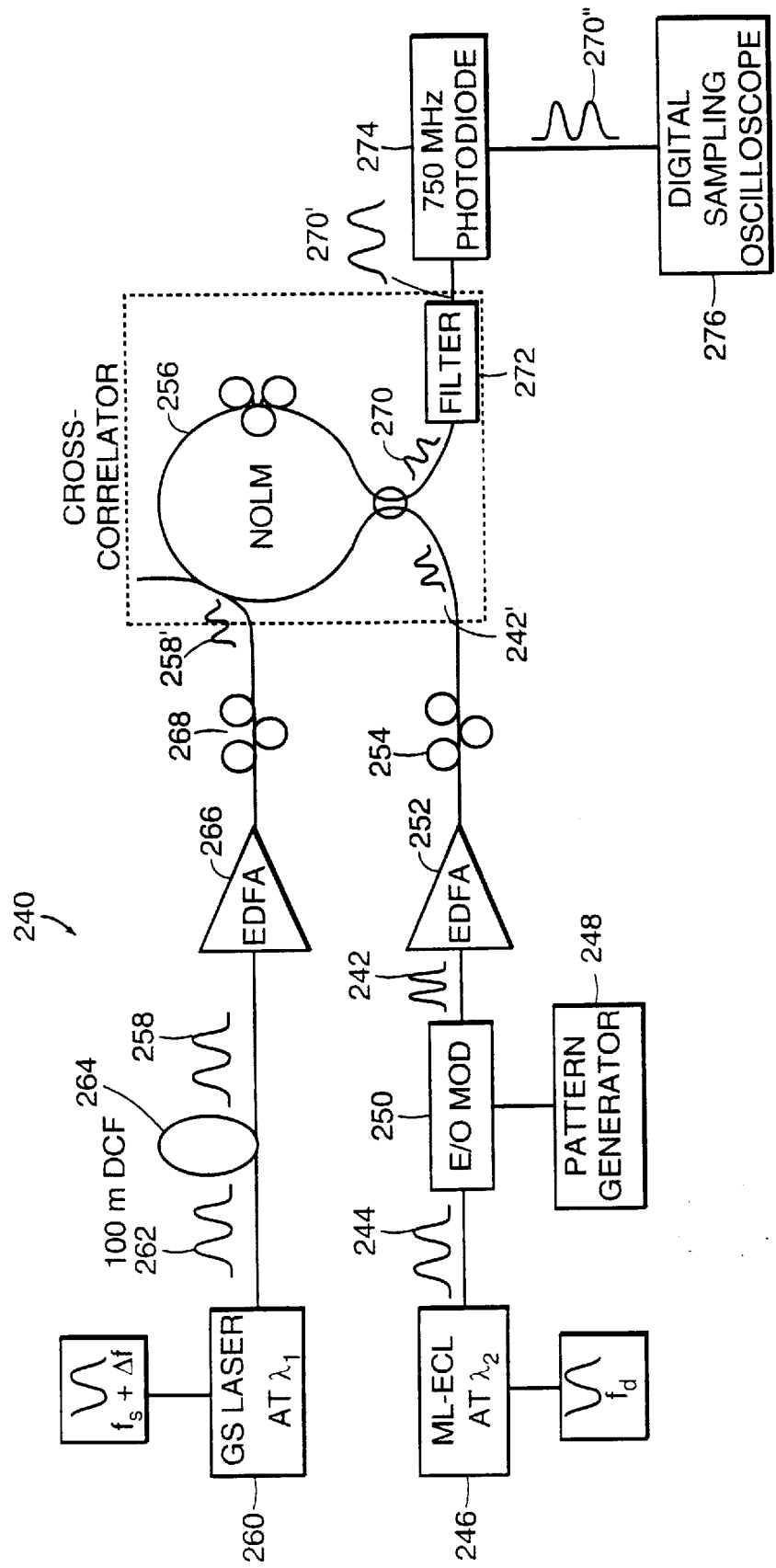
FIG. 8 is a block diagram of another embodiment of an optical bit rate converter according to the invention which was used in a series of experiments.
Figure 9:
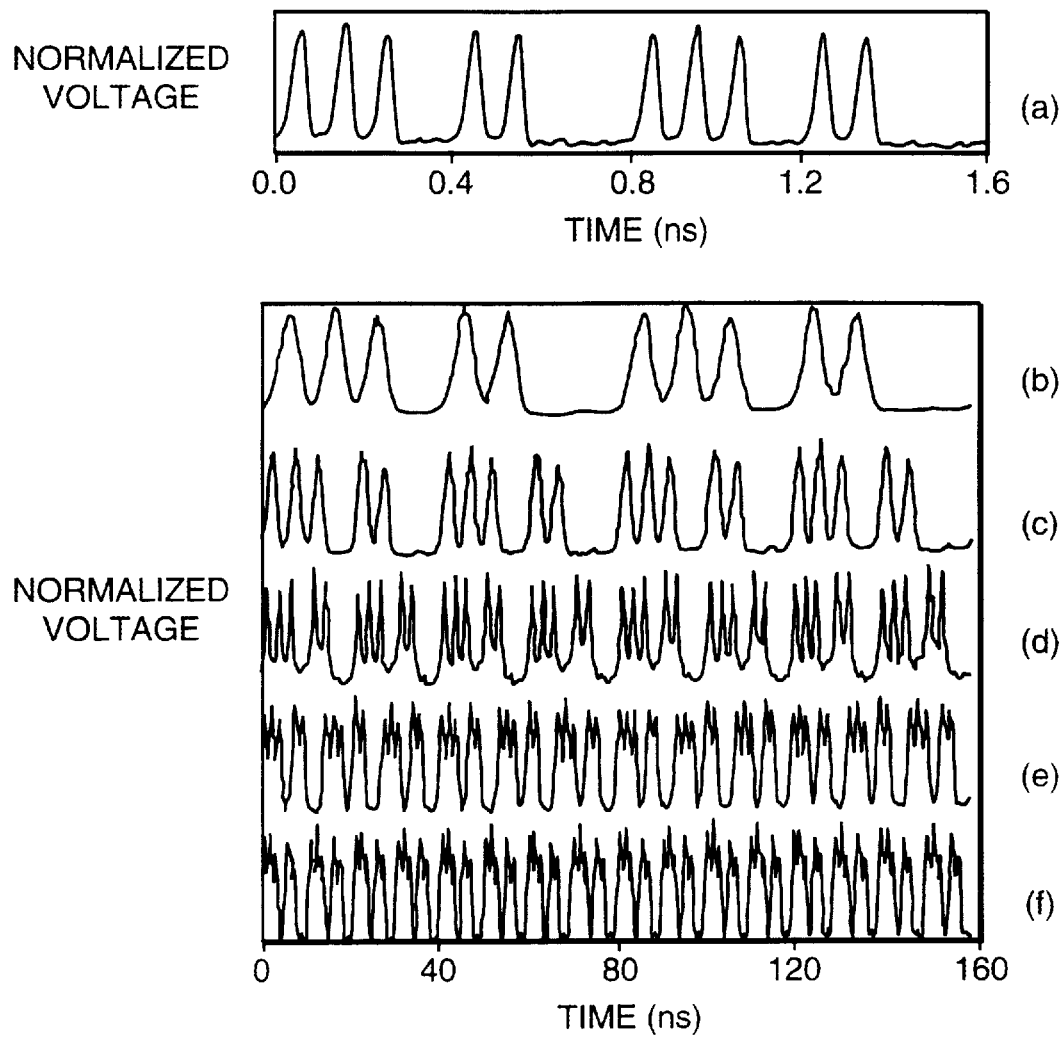
FIG. 9 is a chart illustrating five rate-converted data streams generated by the embodiment of the optical rate converter shown in FIG. 8.

FIG. 8 shows another embodiment of an optical bit rate converter 240 evaluated during the research effort. The optical bit rate converter is similar to the optical bit rate converter 180 described above and shown in FIG. 5. An optical data bit pattern 242 to be rate-converted was generated by modulating the output 244 of a 10 GHz ML-ECL 246 with an optical 8-bit pattern generated by a pattern generator 248. An electro-optical modulator 250 modulated the output 244 of the laser 246. The optical data bit pattern 242 was then amplified by an Erbium Doped Fiber amplifier 252 and then passed through a polarization controller 254. Waveform (a) shown in FIG. 9 illustrates a portion of the optical data bit pattern 242' which was rate-converted. The optical data bit pattern 206 was detected by a photodiode and displayed on a digital sampling oscilloscope, each having a 3 dB bandwidth of 20 GHz. The optical data bit pattern 242' was then introduced as one logical input to a NOLM 256 configured as an optical AND gate.

An optical sampling bit stream 258 was generated by gain-switching a DFB laser 260 and compressing the output pulses 262 in a short length of dispersion compensating fiber (DCF) 264. In the series of experiments, 100 meters of DCF was used. The optical sampling bit stream 258 was then amplified by an amplifier 266 and passed through a polarization controller 268. The optical sampling data bit stream 258' was then introduced as the second logical input to the NOLM 256. In this configuration, the NOLM AND gate 256 output the cross-correlation of the two input streams 242', 258'. In the series of experiments, the pulses of the optical sampling bit stream 258' had a pulse width of approximately 30 picoseconds. The laser 260 was operated at a variety of repetition rates close to 1.25 GHz to obtain a variety of rate-converted data streams.

The NOLM 256 cross-correlated the optical data bit pattern 242' with the optical sampling bit stream 258' to produce a rate-converted optical data bit stream 270. The rate-converted optical data bit stream 270 was filtered by a filter 272 to remove the optical sampling bit stream 258' and then detected by a photodiode 274 having a 3 dB bandwidth of 750 MHz. Limiting the bandwidth of the detector 274 ensured that the envelope of the cross-correlated signal 270, and not individual data pulse correlations, were measured. The photodiode 274 converted the rate-converted optical data bit stream 270' into an electrical signal 270" which was then displayed by a digital sampling oscilloscope 276.

FIG. 9 shows oscilloscope traces generated by the optical bit rate converter 240 described above and shown in FIG. 8 for a variety of output rates. Waveform (a) depicts the original 10 Gb/s optical data bit pattern 242' which was rate-converted. The total display time is 1.6 nanoseconds, corresponding to two bit patterns. Waveform (b) depicts the original optical data bit pattern 242' rate-converted to 100 MHz. Waveform (c) depicts the original optical data bit pattern 242' rate-converted to 200 MHz. Waveform (d) depicts the original optical data bit pattern 242' rate-converted to 400 MHz. Waveform (e) depicts the original optical data bit pattern 242' rate-converted to 600 MHz. Finally, waveform (f) depicts the original optical data bit pattern 242' rate-converted to 800 MHz. The total display time is 160 nanoseconds. The repeating 8-bit pattern of 11101100 of each of the waveforms (a)–(f) is exactly the same, but presented at a different bit rate. The series of experiments demonstrated that an optical sampling technique may be used to achieve rate conversion in network applications where the desired time dilated data streams rates range from 100 MHz to 10 GHz.

Figure 10:
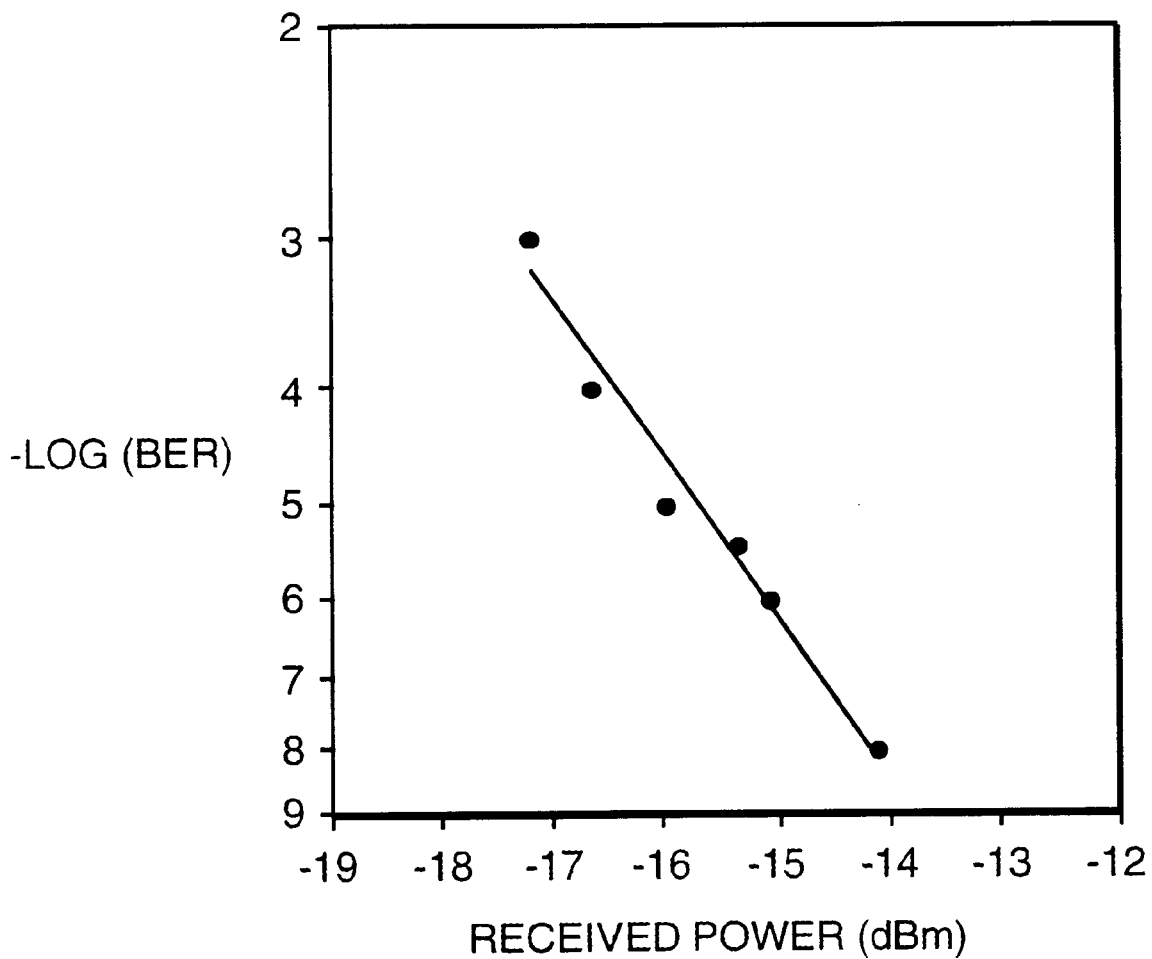
FIG. 10 is a chart illustrating the measured bit-error rate for the rate-converted 100 MHz data stream shown in FIG. 9.

FIG. 10 shows the measured bit-error rate for the rate-converted 100 MHz pattern (waveform (b) of FIG. 9) as a function of received optical power.

The optical bit rate converters 10, 40, 110, 180 and 240 described above and shown in FIGS. 1, 2, 4, 5 and 8, respectively, may be used as a receiver node in a multi-access network to rate convert incoming high and ultra-high speed optical data streams to lower rate optical data streams that can be detected and processed electronically.

Having described preferred embodiments of the invention, it will now become apparent to one of skill in the art that other embodiments incorporating the concepts may be used. It is felt, therefore, that these embodiments should not be limited to disclosed embodiments, but rather should be limited only by the spirit and scope of the following claims.

What is claimed is:

1. An optical communication system, comprising:
   a buffer comprising an output, said buffer presenting a repeating optical data bit pattern at said output of said buffer;
   an optical correlator comprising a first input in communication with said output of said buffer, a second input, and an output; and
   an optical sampler comprising an output in communication with said second input of said optical correlator, said output of said optical sampler presenting an optical sampling bit stream;
   wherein said optical correlator produces a rate-converted optical data bit stream at said output of said optical correlator in response to said repeating optical data bit pattern and said optical sampling bit stream.

2. The optical communication system of claim 1 wherein said buffer further comprises a data input and wherein said buffer stores a data bit stream from a high speed optical data source.

3. The optical communication system of claim 2 wherein said repeating optical data bit pattern is presented at said output of said buffer in response to said stored data bit stream.

4. The optical communication system of claim 1 wherein said repeating optical data bit pattern has a bit rate $R_b$ and a fundamental pattern length N, and said optical sampling bit stream has a bit rate $R_s$ substantially equal to $R_b/K$, wherein K is a positive real number.

5. The optical communication system of claim 4 wherein N is an integer, m is a whole number and $R_s$ is not identically equal to $R_b/mN$.

6. The optical communication system of claim 5 wherein K and N are relatively prime.

7. The optical communication system of claim 6 wherein K is less than or equal to mN, for a predetermined m.

8. The optical communication system of claim 6 wherein said rate-converted optical data bit stream has a bit period $T_{rc}$ substantially equal to $K/R_b$ and a rate conversion time $T_{ct}$ substantially equal to $NK/R_b$.

9. The optical communication system of claim 6 wherein K is substantially equal to mN+1.

10. The optical communication system of claim 4 wherein K is less than or equal to mN and m is a predetermined value.

11. The optical communication system of claim 4 wherein the bit rate $R_s$ of said optical sampling bit stream is substantially equal to $(R_b/mN) - \Delta f$, wherein $\Delta f$ is a frequency offset and m is the largest positive integer for which $\Delta f > 0$.

12. The optical communication system of claim 11 wherein K is a non-integer.

13. The optical communication system of claim 12 wherein K is related to the length N of said repeating optical data bit pattern according to the equation mN<K<nN+1.

14. The optical communication system of claim 13 wherein said rate-converted optical data bit stream has a bit period $T_{rc}$ substantially equal to $1/(mN\Delta f)$ and a rate conversion time $T_{ct}$ substantially equal to $1/m\Delta f$.

15. The optical communication system of claim 13, further comprising:
   an optical filter having an input in communication with said output of said optical correlator.

16. The optical communication system of claim 15, wherein the optical filter includes a narrow band optical filter.

17. The optical communication system of claim 13, further comprising:
   a detector having an input in communication with said output of said optical correlator and an output; and
   a low-pass electrical filter having an input in communication with said output of said detector.

18. The optical communication system of claim 12 wherein $\Delta f$ is substantially, but not identically equal to zero when K is substantially, but not identically equal to mN.

19. The optical communication system of claim 12 wherein $\Delta f$ is substantially, but not identically equal to $R_b/mN(mN+1)$ when K is substantially, but not identically equal to mN+1.

20. The optical communication system of claim 12 wherein K is substantially equal to mN+1.

21. A method for rate-converting an optical data stream, comprising the steps of:
   (a) receiving an optical data bit pattern from the optical data stream;
   (b) repeatedly presenting the received optical bit pattern;
   (c) providing an optical sampling bit stream;
   (d) correlating said repeating optical data bit pattern with said optical sampling bit stream; and
   (e) producing a rate-converted optical data bit stream in response to said correlation.

22. The method of claim 21 wherein the step of producing a rate-converted optical data bit stream further comprises the step of filtering the correlated repeating optical data bit pattern and optical sampling bit stream.

23. The method of claim 22 wherein the step of filtering the correlated repeating optical data bit pattern and optical sampling bit stream further comprises the step of optically filtering the correlated repeating optical data bit pattern and optical sampling bit stream.

24. The method of claim 22 wherein the step of filtering the correlated repeating optical data bit pattern and optical sampling bit stream further comprises the step of electrically filtering the correlated repeating optical data bit pattern and optical sampling bit stream with low-pass filter.

25. The method of claim 21 further comprising providing a buffer, said buffer performing the steps of receiving and repeatedly presenting.

26. The method of claim 25 wherein the step of providing an optical sampling bit stream further comprises the step of providing an optical sampler having an output, said optical sampler providing said optical sampling bit stream at said output of said optical sampler; and
   wherein the step of correlating said repeating optical data bit pattern with said optical sampling bit stream further comprises the step of providing an optical correlator having a first input in communication with said output of said buffer, a second input in communication with said output of said optical sampler, and an output.

27. A receiver, comprising:
   a buffer comprising an output, said buffer presenting a repeating optical data bit pattern at said output of said buffer;
   an optical correlator comprising a first input in communication with said output of said buffer, a second input, and an output; and an optical sampler comprising an output in communication with said second input of said optical correlator, said output of said optical sampler presenting an optical sampling bit stream; and wherein said optical correlator produces a rate-converted optical data bit stream at said output of said optical correlator in response to said repeating optical data bit pattern and said optical sampling bit stream.

28. A method for demultiplexing a data stream, comprising the steps of:
   (a) receiving an optical data bit pattern from the data stream, wherein the optical bit pattern has a bit rate $R_b$ and a fundamental pattern length N;
   (b) repeatedly presenting the received optical bit pattern;
   (c) providing an optical sampling bit stream having a bit rate $R_s$ substantially equal to $R_b/K$, wherein K is an integer and K and N are relatively prime;
   (d) correlating said repeating optical data bit pattern with said optical sampling bit stream; and
   (e) producing a demultiplexed optical data bit stream in response to said correlation.

29. A method for time dilating a data stream, comprising steps of:
   (a) receiving a optical data bit pattern from the optical data stream, wherein the optical bit pattern has a bit rate $R_b$ and a length N;
   (b) repeatedly presenting the received optical bit pattern;
   (c) providing an optical sampling bit stream having a bit rate $R_s$ substantially equal to $R_b/K$, wherein K is an integer;
   (d) correlating said repeating optical data bit pattern with said optical sampling bit stream; and
   (e) producing a time dilated optical data bit stream in response to said correlation.

30. The method of claim 29 wherein K is a non-integer and is related to the fundamental pattern length N of said repeating optical data pattern according to the equation $mN<K<mN+1$.

* * * * *

UNITED STATES PATENT AND TRADEMARK OFFICE
CERTIFICATE OF CORRECTION

PATENT NO. : 6,175,433 B1
DATED : January 16, 2001
INVENTOR(S) : Naimish S. Patel, Katherine L. Hall, John D. Moores, Kristin A. Rauschenbach, Steven G. Finn, Richard A. Barry It is certified that error appears in the above-identified patent and that said Letters Patent is hereby corrected as shown below:

Column 15,
Line 63, "mN<K<nN+1" should be -- mN<K<mN+1 --.
Line 67, "$T_{c1}t$" should be -- $T_{c1}$ --.

Signed and Sealed this

Fifth Day of March, 2002

Attest:

Attesting Officer

JAMES E. ROGAN
Director of the United States Patent and Trademark Office